(12) United States Patent
Rohwer

(10) Patent No.: US 8,402,480 B2
(45) Date of Patent: Mar. 19, 2013

(54) SYSTEMS AND METHODS FOR GENERATING A SWIMLANE TIMELINE FOR TASK DATA VISUALIZATION

(75) Inventor: Daniel Rohwer, Northfield, MN (US)

(73) Assignee: Visibility.Biz Inc., Eagan, MN (US)

( * ) Notice: Subject to any disclaimer, the term of this patent is extended or adjusted under 35 U.S.C. 154(b) by 1009 days.

(21) Appl. No.: 12/316,084

(22) Filed: Dec. 9, 2008

(65) Prior Publication Data

US 2009/0293074 A1    Nov. 26, 2009

Related U.S. Application Data

(60) Provisional application No. 61/024,973, filed on Jan. 31, 2008.

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |

(52) U.S. Cl. ...................................................... 719/328
(58) Field of Classification Search ................... 719/328
See application file for complete search history.

(56) References Cited

U.S. PATENT DOCUMENTS

| | | | |
|---|---|---|---|
| 2002/0046394 A1* | 4/2002 | Do et al. ........................ | 717/108 |
| 2003/0018746 A1* | 1/2003 | Boesch .......................... | 709/218 |
| 2003/0233631 A1* | 12/2003 | Curry et al. .................... | 717/100 |
| 2005/0203718 A1* | 9/2005 | Carek et al. ...................... | 703/1 |
| 2007/0288283 A1 | 12/2007 | Fitzpatrick | |
| 2008/0221946 A1* | 9/2008 | Balon ................................ | 705/7 |
| 2012/0079408 A1 | 3/2012 | Rohwer | |

OTHER PUBLICATIONS

Walker et al., Microsoft® Office Visio® 2003 Inside Out, Nov. 19, 2003, Microsoft Press, pp. 1-54.*
"U.S. Appl. No. 12/890,521, Non Final Office Action mailed Jun. 8, 2010", 29 pgs.
"Gantt chart software", MatchWare MindView 3 Business, (Jan. 3, 2010).
"Seavus Project Viewer 4.1 User Manual", Seavus Group, (Jan. 2, 2010), 121 pgs.

* cited by examiner

*Primary Examiner* — Andy Ho
*Assistant Examiner* — Timothy A Mudrick

(57) ABSTRACT

The Swimlane Timeline application for task data visualization utilizes the Microsoft Visio Application Programming Interface (API) to visualize user specified task data. The task data includes one or more of: task name, task outline number, task start date, and/or task finish date. The application solicits, interprets, and visualizes the data by mapping the user selected top-level outline number "n" as the parent task that defines the timeline and title, the "n.n" child tasks to swim lane rows, and the "n.n.n . . . " lower level tasks to intervals and milestones within the swim lanes. Task analysis and reporting are enhanced with features including task drill-in, task filtering, and other user visualization preferences.

18 Claims, 17 Drawing Sheets

| VISIBILITY WIDGET DEVELOPMENT SCHEDULE | | | | | | | | | | | | |
|---|---|---|---|---|---|---|---|---|---|---|---|---|
| YEAR | 2007 | | 2008 | | | | | | | | | |
| QUARTER | Q4 | | Q1 | | | Q2 | | | Q3 | | | Q4 |
| MONTH | NOV | DEC | JAN | FEB | MAR | APR | MAY | JUN | JUL | AUG | SEP | OCT |
| HIGH LEVEL MILESTONES | | | | ☆ Phase 1 Development Widget Tool Core Complete | | | | | ☆ Phase 2 Widget Tool Enhancements Complete ☆ Phase 3 Port for Web Services Complete ◇ Project Complete | | | |
| PHASE 1 - DEVELOPMENT WIDGET TOOL CORE | | Phase 1 Design Considerations / Phase 1 Development / Create Phase 1 Documentation / Deliver Phase 1 Training / Phase 1 Project Administration | | | | | | | | | | |
| PHASE 2 - WIDGET TOOL ENHANCEMENT | | | | Phase 2 Design Considerations / Phase 2 Development | | | Create Phase 2 Documentation / Deliver Phase 2 Training / Phase 2 Project Administration | | | | | |
| PHASE 3 - PORT WIDGET TOOL FOR WEB SERVICES | | | | | | | | | Phase 3 Design Considerations / Phase 3 Dev / Create Phase 3 Documentation / Deliver Phase 3 Training / Phase 3 Project Administration | | | |

PARENT TASKS / CHILD TASKS / GRANDCHILD TASKS — 200

*FIG. 2*

| Shape Data - ThePage | | |
|---|---|---|
| Interval / Milestone Highlight Color | 6 pt. | |
| Primary Swim Lane Highlight Color | RGB(204, 222, 255) | |
| Primary Time Span Highlight Color | RGB(255, 211, 204) | |
| Primary Title Fill Color | RGB(114, 159, 220) | |
| Primary Date Fill Color | RGB(204, 222, 255) | |
| Primary Milestone Fill Color | RGB(162, 0, 20) | |
| Primary Milestone Line Color | RGB(162, 0, 20) | |
| Primary Interval Fill Color | RGB(234, 220, 187) | |
| Primary Interval Line Color | RGB(202, 144, 101) | |
| Primary Today's Date Marker Line Color | RGB(192, 0, 0) | |
| Secondary Swim Lane Highlight Color | RGB(204, 222, 255) | |
| Secondary Time Span Highlight Color | RGB(255, 211, 204) | |
| Secondary Title Fill Color | RGB(114, 159, 220) | |
| Secondary Date Fill Color | RGB(204, 222, 255) | |
| Secondary Milestone Fill Color | RGB(162, 0, 20) | |
| Secondary Milestone Line Color | RGB(162, 0, 20) | |

| Shape Data - Interval.82 | X |
|---|---|
| Outline Number | 1.2.7 |
| Name | Develop PIN Generation |
| Short Name | Develop PIN Generation |
| Start Date | 12/18/2007 |
| End Date | 01/08/2008 |
| Text Location | Wrapped Right |
| % Complete | 0% |
| Critical Task | TRUE |
| Cost | $0.00 |
| ProjectIdentity | Visibility Timeline Example |
| Subproject_File | |
| Duration | 6 days |
| Unique_ID_Predecessors | 113 |
| Unique_ID | 178 |

| | A | B | C | D |
|---|---|---|---|---|
| 1 | Name | Outline_Number | Start_Date | Finish_Date |
| 2 | Visibility Widget Development Schedule | 0 | 11/19/07 | 10/10/08 |
| 3 | Phase 1 - Develop Widget Tool Core | 1 | 11/19/07 | 3/4/08 |
| 4 | Phase 1 Design Considerations | 1.1 | 11/19/07 | 12/7/08 |
| 5 | Phase 1 - Development | 1.2 | 11/19/07 | 1/23/08 |
| 6 | Create Phase 1 Documentation | 1.3 | 1/10/08 | 2/1/08 |
| 7 | Deliver Phase 1 Training | 1.4 | 2/4/08 | 2/12/08 |
| 8 | Phase 1 Project Administration | 1.5 | 11/19/07 | 3/4/08 |
| 9 | Phase 1 - Develop Widget Tool Core Complete | 2 | 2/12/08 | 2/12/08 |
| 10 | Phase 2 - Widget Tool Enhancements | 3 | 2/12/08 | 7/3/08 |
| 11 | Phase 2 Design Considerations | 3.1 | 2/13/08 | 2/15/08 |
| 12 | Phase 2 - Development | 3.2 | 2/15/08 | 4/30/08 |
| 13 | Create Phase 2 Documentation | 3.3 | 4/28/08 | 5/9/08 |
| 14 | Deliver Phase 2 Training | 3.4 | 5/9/08 | 5/15/08 |
| 15 | Phase 2 Project Administration | 3.5 | 2/12/08 | 7/3/08 |
| 16 | Phase 2 - Widget Tool Enhancements Complete | 4 | 7/3/08 | 7/3/08 |
| 17 | Phase 3 - Port Widget Tool for Web Services | 5 | 7/3/08 | 10/10/08 |
| 18 | Phase 3 Design Considerations | 5.1 | 7/3/08 | 7/18/08 |
| 19 | Phase 3 - Development | 5.2 | 7/8/08 | 8/4/08 |
| 20 | Create Phase 3 Documentation | 5.3 | 7/25/08 | 8/1/08 |
| 21 | Deliver Phase 3 Training | 5.4 | 8/1/08 | 8/7/08 |
| 22 | Phase 3 Project Administration | 5.5 | 7/3/08 | 10/10/08 |
| 23 | Phase 3 - Port Widget Tool for Web Services Complete | 6 | 10/10/08 | 10/10/08 |
| 24 | Project Complete | 7 | 10/10/08 | 10/10/08 |

*FIG. 11*

| Title | Outline Number | Start Date | Due Date |
|---|---|---|---|
| Visibility Widget Development Schedule | 0 | 11/19/07 | 10/10/08 |
| Phase 1 - Develop Widget Tool Core | 1 | 11/19/07 | 3/4/08 |
| Phase 1 Design Considerations | 1.1 | 11/19/07 | 12/7/08 |
| Phase 1 - Development | 1.2 | 11/19/07 | 1/23/08 |
| Create Phase 1 Documentation | 1.3 | 1/10/08 | 2/1/08 |
| Deliver Phase 1 Training | 1.4 | 2/4/08 | 2/12/08 |
| Phase 1 Project Administration | 1.5 | 11/19/07 | 3/4/08 |
| Phase 1 - Develop Widget Tool Core Complete | 2 | 2/12/08 | 2/12/08 |
| Phase 2 - Widget Tool Enhancements | 3 | 2/12/08 | 7/3/08 |
| Phase 2 Design Considerations | 3.1 | 2/13/08 | 2/15/08 |
| Phase 2 - Development | 3.2 | 2/15/08 | 4/30/08 |
| Create Phase 2 Documentation | 3.3 | 4/28/08 | 5/9/08 |
| Deliver Phase 2 Training | 3.4 | 5/9/08 | 5/15/08 |
| Phase 2 Project Administration | 3.5 | 2/12/08 | 7/3/08 |
| Phase 2 - Widget Tool Enhancements Complete | 4 | 7/3/08 | 7/3/08 |
| Phase 3 - Port Widget Tool for Web Services | 5 | 7/3/08 | 10/10/08 |
| Phase 3 Design Considerations | 5.1 | 7/3/08 | 7/18/08 |
| Phase 3 - Development | 5.2 | 7/8/08 | 8/4/08 |
| Create Phase 3 Documentation | 5.3 | 7/25/08 | 8/1/08 |
| Deliver Phase 3 Training | 5.4 | 8/1/08 | 8/7/08 |
| Phase 3 Project Administration | 5.5 | 7/3/08 | 10/10/08 |
| Phase 3 - Port Widget Tool for Web Services Complete | 6 | 10/10/08 | 10/10/08 |
| Project Complete | 7 | 10/10/08 | 10/10/08 |

*FIG. 12*

SYSTEMS AND METHODS FOR GENERATING A SWIMLANE TIMELINE FOR TASK DATA VISUALIZATION

PRIORITY APPLICATIONS

This application claims the benefit of priority under 35 U.S.C. §119(e) to U.S. Provisional Application No. 61/024,973, filed Jan. 31, 2008, entitled "Swimlane Timeline Application for Task Data Visualization," which is incorporated herein by reference in its entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, Visibility.biz, Inc.

FIELD

Embodiments of the inventive subject matter relate generally to applications to display task data, and more particularly to generating a swimlane timeline for task data.

BACKGROUND

Companies often use project management software to visualize time estimates and progress of projects. One useful visualization mechanism is the swimlane timeline in which various tasks associated with a project, or portfolio of projects, are placed in vertically stacked horizontal lanes referred to as "swimlanes".

BRIEF DESCRIPTION OF THE FIGURES

Embodiments of the invention are illustrated by way of example and not limitation in the Figures of the accompanying drawings in which:

FIG. 2 illustrates an example swimlane timeline according to embodiments of the invention.

FIG. 4 illustrates an example primary and secondary color palette configuration dialogue used in embodiments of the invention.

FIG. 6 illustrates an example of Shape Data associated with a selected task according to embodiments of the invention.

FIG. 11 illustrates an example Microsoft Office Excel source file tasks highlighting unique outline numbers used to create a visualization hierarchy according to embodiments of the invention.

FIG. 12 illustrates an example Microsoft Office SharePoint source tasks highlighting unique outline numbers used to create a visualization hierarchy according to embodiments of the invention.

DESCRIPTION OF THE EMBODIMENTS

Figure 1:
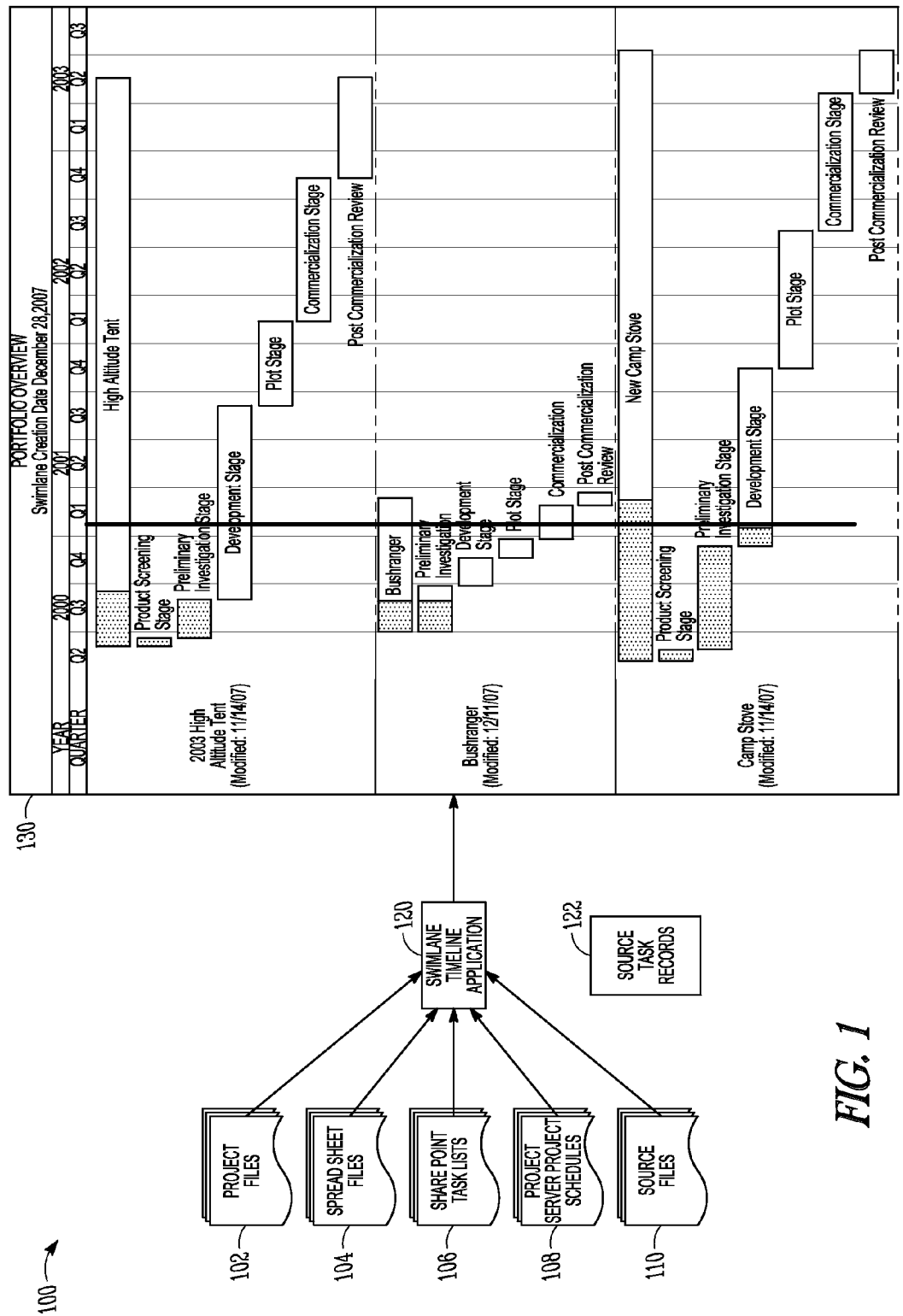
FIG. 1 is a block diagram illustrating various components of a swimlane generation application and an example process flow with task data records input, and a swimlane timeline visualization output according to embodiments of the invention.

In the following detailed description of exemplary embodiments of the inventive subject matter, reference is made to the accompanying drawings which form a part hereof, and in which is shown by way of illustration specific exemplary embodiments in which the inventive subject matter may be practiced. These embodiments are described in sufficient detail to enable those skilled in the art to practice the inventive subject matter, and it is to be understood that other embodiments may be utilized and that logic and other changes may be made without departing from the scope of the inventive subject matter. The following detailed description is, therefore, not to be taken in a limiting sense.

Overview

Companies struggle to gain insight and control of their task data; particularly when it is associated with a specific project. Companies also have the need to view tasks within one project in relation to tasks of another project, or collection of projects. This is sometimes referred to as a Portfolio view. In addition, companies desire a method to drill-in on tasks for additional detail as necessary. They also seek methods for filtering on a specific date range, and filtering on a specific type of task to focus their attention on key tasks for analysis and reporting.

It is difficult, costly and time consuming to manually build task and portfolio reports with data that is constantly changing. The complexity of generating reports multiplies exponentially as the number of source files increases. The swimlane timeline addresses these issues by leveraging existing task data storage methods and generating a task mapped visualization that is accurate, timely, and easy to decipher for analysis and reporting.

Many users, and many applications, store task data utilizing a parent/child relationship. A parent task can have many associated sub level child tasks. Additionally, child tasks can have subtasks associated with them, and so on. This parent/child relationship is commonly defined and stored in a hierarchical fashion using the outline notation "n.n.n … " and is referred to as an outline number, or project task work breakdown structure. Each task may also have an associated start date and/or finish date. Tasks can additionally have an associated percent complete value, as well as task dependencies defined, and often a critical task field. The swimlane timeline tool systems and methods, according to their various embodiments, has the capability to utilize all of these fields for customized task analysis and report generation.

In some embodiments, the Swimlane Timeline Tool is implemented as a Visio add-on template that runs on the Microsoft Office Visio 2003 and 2007 (Standard or Professional) graphics engine, and it contains Visio object model methods, functions, subroutines, as well as Visio ShapeSheet algorithms, and custom developed Visio Shapes that permit reading the project task data from the source file(s), applying user selected filters and visualization preference settings, and automatically generating a diagram referred to as a swimlane timeline.

The top level timeline of the diagram may be defined by the start and finish date of the user specified top level parent summary task. When multiple source files are selected, embodiments of the swimlane timeline system run through each selected source file's parent task, and determines the earliest start and latest finish dates that encompass all source files selected. Once the top level timeline start and finish dates are established, the timeline is placed at the top of the diagram. The timeline length and time interval selected determines the diagram width. The lowest level interval is user selectable, and can be either days, weeks, months, quarters, years, or Auto. An "Auto" setting provided in some embodiments allows solution algorithms to determine an interval type best used for the generation of a 3:4 aspect ratio visualization and printing.

The sub level swim lanes are made up of the child tasks of the parent task, and are vertically stacked below the timeline as they are encountered in the data from top to bottom. Milestones at the child task outline level are placed in a special "High Level Milestones" swim lane.

The lower level intervals and milestones are grandchild tasks, and they may be placed vertically within their associated swim lane parent as they are encountered in the source file(s) from top to bottom, and horizontally placed within the swim lane relative to the top level parent timeline. Solution algorithms in some embodiments can automatically adjust a swim lane height to encompass all grandchild tasks encountered. The diagram page height also grows in relation to the swim lanes growth.

A further aspect of various embodiments includes a Change Drawing Generation Information dialogue that solicits user preferences. This dialogue may be presented to the user when the swimlane timeline solution begins. The dialogue can also be accessed after the initial diagram is generated for regeneration purposes. The user preferences in the drawing generation dialogue may include:

Source file(s)
Starting outline number
Single page outline level depth
Multi page outline level depth
Timeline interval
Timeline start date
Timeline end date
Swimlanes to include
Apply custom fields for task visibility, short name, color, and type
Show only tasks with the calculated task field "Critical" set to "Yes"
Show task dependencies if they are defined in the source file(s)

A further aspect of various embodiments includes the support of, but not limited to, the following source file formats:

Project 2000-2007 MPP files
Excel 97-2007 XLS files
Project Server 2003-2007 files
SharePoint 2003-2007 Task Lists
And other software platforms and file formats.

A further aspect of various embodiments includes the option to select multiple source files for the creation of an ad hoc portfolio view of a group of source files. Each swim lane title in the portfolio view is the source file's name. The source file's "Last Modified" date can also be shown.

A further aspect of various embodiments includes the ability to show a user selectable "Single page outline level depth". The single page outline level depth preference combined with the other available filters can allow an organization to visualize their specific key tasks to track on one single page.

A further aspect of various embodiments is the ability to drill-in on a swim lane or interval task. The drill-in action creates a new page labeled with the task outline number and name. The new page will be another swim lane timeline with the selected task at the parent task, its children tasks as the swim lanes, and its grand children tasks as intervals and milestones. A bi-directional hyperlink is automatically added by the Swimlane Timeline Tool to aid navigation.

A further aspect of various embodiments includes the option to automatically drill-in each swim lane during the initial diagram generation based on the "Multi page outline level depth" setting.

A further aspect of various embodiments includes the option to "Apply custom fields for task short name, color, and type". When utilized, the system will override the swimlane timeline default attributes based on custom fields that reside within the source file(s). These fields include a task short name text to display, task color number to use for an interval or milestone, and task milestone type number. The color numbers are based on the Visio default color palette mapping. The milestone type number mapping is shown below:

Diamond
2 Triangles
Pin
Star
Up Arrow

A further aspect of various embodiments includes the option to filter tasks visualized. The swimlane timeline code will only display tasks that meet the filter criteria (for example, if the task associated "Critical" field, or the "VisibilityFlag" field, is set to "Yes" in the source data).

A further aspect of various embodiments includes the visualization of a "Percent Complete" field if it exists in the source file(s). The percent complete shapes are placed in a "Percent Complete" layer in Visio. Users have the ability to display or hide the percent complete visualization via Visio's layer control settings. There are a number of various methods that the task percent complete value can be visualized.

A further aspect of various embodiments includes the option to display task dependencies with arrows showing the flow of the dependency between the tasks. Arrows start at either an interval or milestone lower left or lower right side based on the type of dependency either with a beginning point of Start or Finish, respectively. Arrows end at either an interval or milestone upper left or upper right based on the type of dependency either from a ending point of Start or Finish, respectively. The dependency arrows are placed on a Visio "dependency" layer so they can be easily shown or hidden. The dependency arrows can be further customized to show dependency lag and lead times. In some embodiments, there are four supported types of dependencies:

Start-to-Start
Start-to-Finish
Finish-to-Start
Finish-to-Finish

A further aspect of various embodiments includes the option to override default RGB color assignments and text size settings for swimlane timeline global color and text attributes. There are multiple customizable palettes to edit and select. The user changeable swimlane timeline global attributes in some embodiments include:

Interval & Milestone Text Size
Title Fill Color
Date Fill Color
Swim lane highlight color
Time span highlight color
Interval fill color
Interval line & percent complete color
Milestone fill color
Milestone line color
Today's date marker line color A further aspect of various embodiments includes the option to show or hide a Time Interval highlight. Multiple time intervals can have their highlight turned on as desired.

A further aspect of various embodiments includes the option to show or hide Today's Date Indicator that may be a thin red transparent line that runs through all swim lanes for the vertical height of the entire diagram. This feature is accessed from the Visibility pull-down menu.

A further aspect of various embodiments includes the option to show or hide a single, or multiple, Add Date Indicators that may be a thin blue transparent line that runs through all swim lanes for the vertical height of the entire diagram. This feature is accessed from the Visibility pull-down menu.

A further aspect of various embodiments includes the option to reposition the task label with a right-click action on the task. Possible task label positions for intervals include: Wrapped Centered, Wrapped Right, and Wrapped Left. Possible label positions for milestones includes all of the above, and in addition: Centered, Upper Right, Upper Left, Centered Right, Centered Left, Lower Right and Lower Left. Alternatively, users can freely reposition the task label using Visio's native Text Block Tool.

A further aspect of various embodiments includes the option to lock the timeline and swimlane titles. This option allows the user to navigate anywhere in the diagram and still see the time interval and swimlane titles. To activate, right-click in the diagram white border area, and select "Toggle Title Lock On/Off".

A further aspect of various embodiments includes the full support of Visio native features including, but not limited to: color control, text control, line types, fill types, print controls, save as web, pan and zoom window, keyboard shortcuts, layer control, and selecting multiple shapes and changing settings for all.

FIG. 1 is a block diagram illustrating various components of a swimlane generation application and an example process flow with task data records input, and a swimlane timeline visualization output according to embodiments of the invention.

FIG. 1 is a block diagram illustrating the components of a swimlane timeline system 100, an example Process Flow with Task Data Records input, and a Swimlane Timeline visualization output. In the example system 100, workflow includes software swimlane timeline application 120. In some embodiments of the inventive subject matter, the swimlane timeline application 120 may be implemented using C# programming language and the .NET Framework 2.0 development environment available from Microsoft Corporation. However, the embodiments of the inventive subject matter are not limited to a particular programming language or development environment. In alternative embodiments, the software application may, for example, be developed using Visual Basic, C++ or Visual Basic for Applications programming languages. Swimlane timeline application 120 may interface with diagramming software or software components. In some embodiments, the swimlane timeline application 120 interfaces with a Microsoft Visio drawing engine that provides programmatic access to the Visio object model and Visio ShapeSheet environment. In alternative embodiments, other diagramming software components may be used. Examples include Schematic, SmartDraw, Dia, OmniGraffle, Inspiration, JGraph or ConceptDraw 7. The embodiments are not limited to any particular diagramming software component.

Various source files may be used to provide data for the swimlane timeline application 120. Examples of such source files include one or more of the following:

Microsoft Project MPP files 102
Microsoft Excel XLS files 104
Microsoft SharePoint Task Lists 106
Microsoft Project Server project schedules 108
Other source files that contain similar fields 110

FIG. 1 also illustrates various source file task fields 122 used that may be used, and optional fields for the swimlane timeline application 120. The source file task fields that are used in some embodiments include:

Task Name (text)
Task Outline Number (text)
Task Starting Date (date)
Task Finish Date (date)

The source file task fields that are optional include:

Task Percent Complete (number)
Task "Critical" Field (Yes/No)
Task Unique ID (text)
Task Unique ID Predecessors (text)
Task Baseline Start
Task Baseline Finish
Task Actual Start
Task Actual Finish
Visibility (Yes/No flag)
Visibility Color (number)
Visibility Type (number)
Visibility Short Name (text)

FIG. 2 illustrates an example swimlane timeline 200 according to embodiments of the invention. Swimlane Timeline 200 shows an example Parent/Child/Grandchild Task (n.n.n . . . ) Visual Mapping. By default, the top level parent task is the summary task outline number 0, and the child tasks are at outline number "n", and the grandchild tasks are at outline number "n.n". Therefore, by default the 3 levels of visualization depth is the summary task 0, its "n" children, and their "n" children, or "0.n.n". The summary task 0 defines the diagram title and timeline date range. Child tasks 1–n define the swim lanes. If a child task has duration of 0 where the start date equals the finish date, then it is interpreted as a high level milestone, and is placed in a special High Level Milestones swim lane. The subtasks of the Child tasks 1–n are placed within their associated swim lanes as intervals or milestones.

Figure 3:
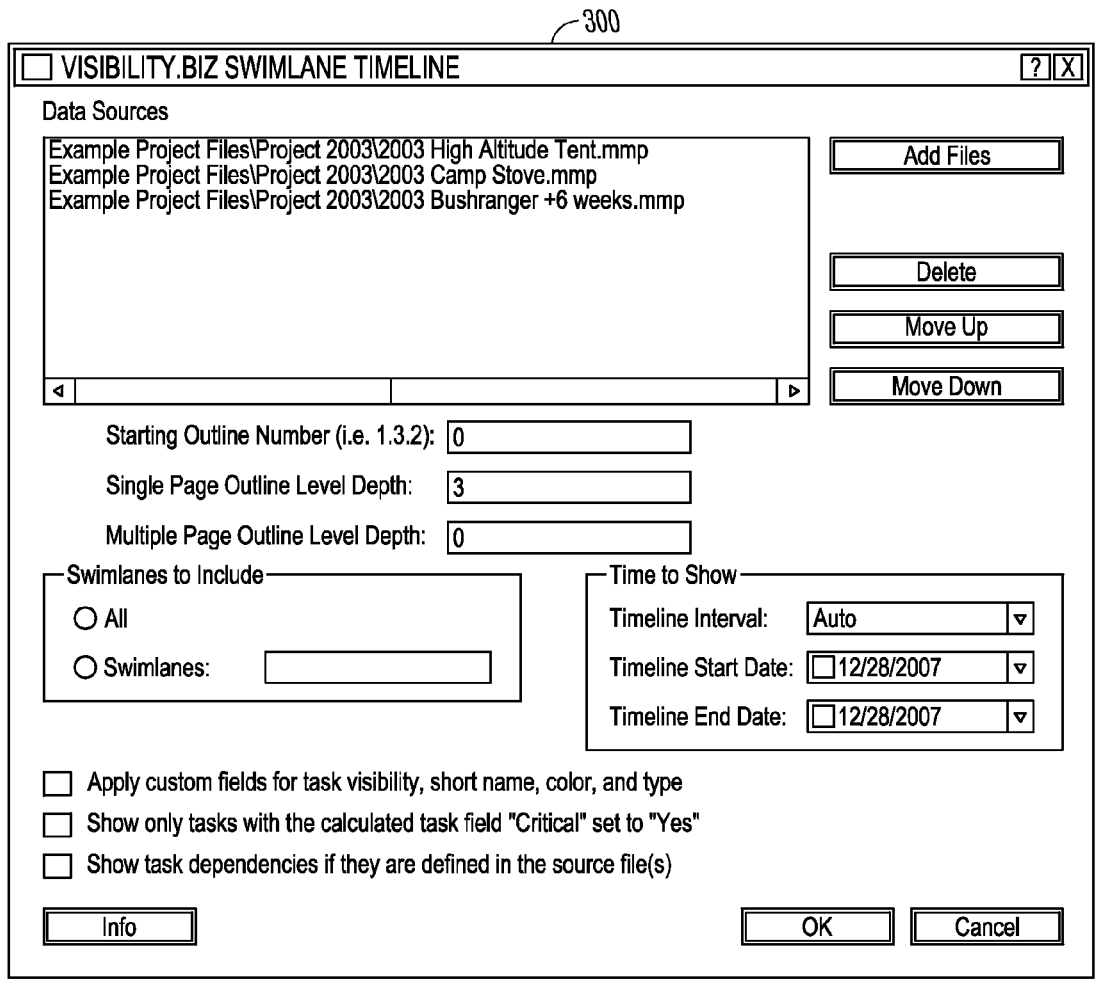
FIG. 3 illustrates an example drawing generation and source file selection dialogue used in embodiments of the invention.

FIG. 3 illustrates an example change drawing generation information dialogue 300 used in embodiments of the invention. Dialogue 300 may be presented when the swimlane timeline application 120 is first opened. The dialogue can also be accessed after the initial diagram is generated, with a right-click action on the Swimlane Timeline white border area, or from the Visibility pull-down menu. This will permit diagram regeneration with any revised user preferences. If the source files remain constant, then the regeneration process will reference cached task data, and, therefore, the swimlane timeline will regenerate immediately. If the source files are changed in the dialogue, or if a swimlane timeline diagram is re-opened, then the source files will be re-read to ensure that the latest source data is utilized. A saved portfolio view of multiple source files, therefore, can be quickly regenerated with the latest task data by opening the Change Drawing Generation Information dialogue and clicking "OK".

FIG. 4 illustrates an example primary and secondary color palette configuration dialogue 400 used in embodiments of the invention. This ability to see and change color definitions is accessed from the Visibility pull-down menu, and color palette values can be modified with either the Visio 2003 Custom Property Window, or the Visio 2007 Shape Data Window.

Figure 5:
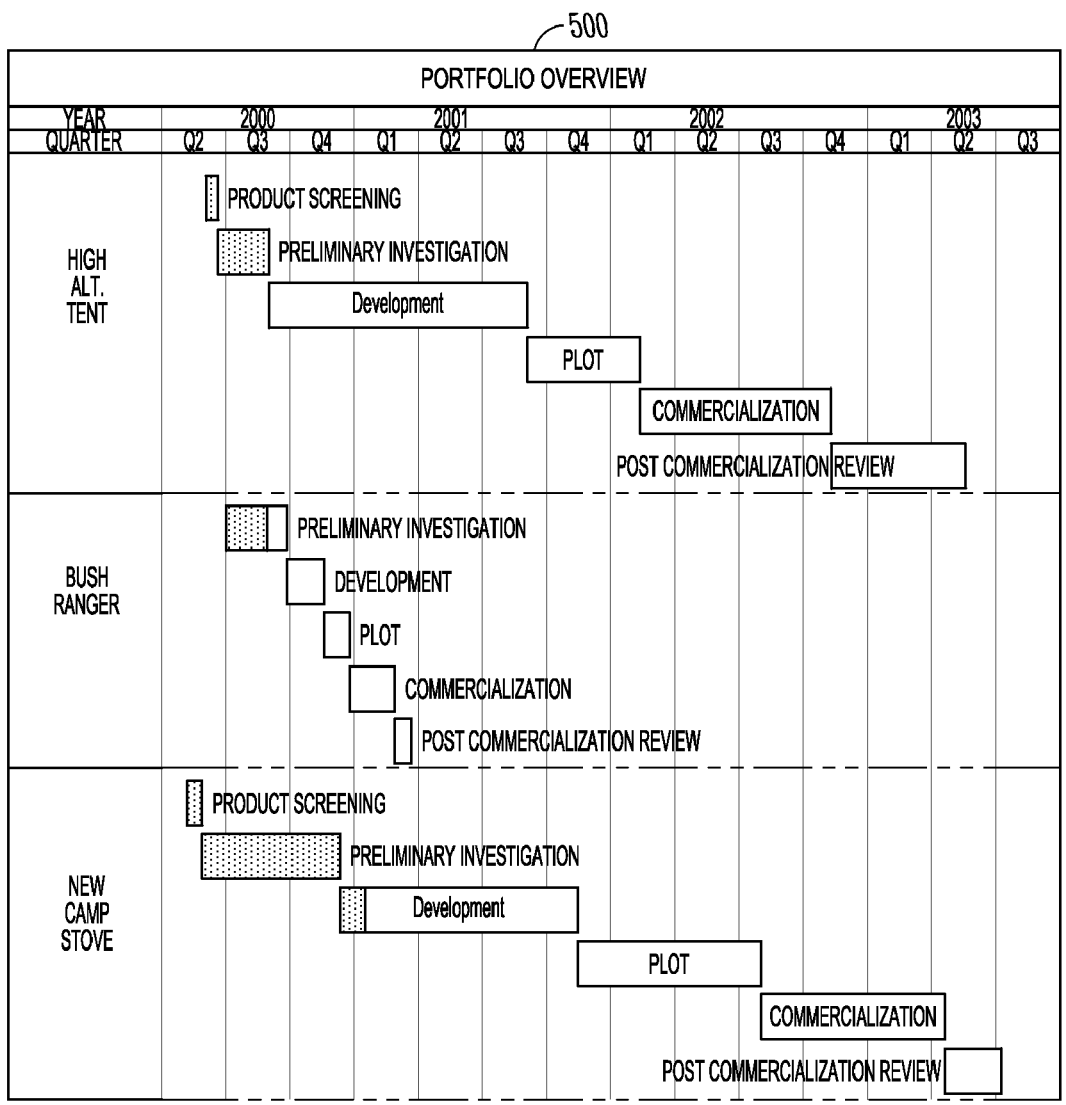
FIG. 5 illustrates an example multi-project portfolio view according to embodiments of the invention.

FIG. 5 illustrates an example portfolio view 500 according to embodiments of the invention. In the example provided, the Portfolio View 500 includes the display of a percent complete and a time interval highlight for tasks in the view. If a "Percent Complete" field exists in the source data, then the percent complete value is interpreted graphically on the task that it is associated with. It usually starts from the interval task left side, and the length of the graphic displayed is determined as a percentage of the overall length of the interval task. The percent complete shapes are placed on a Visio "Percent Complete" layer so they can be easily shown or hidden.

The time interval highlight feature is accessed via a right-click on a time interval in the timeline. When selected, a highlighted and transparent time interval band that is the width of the interval is displayed throughout all swim lanes and for the vertical height of the entire diagram.

FIG. 6 illustrates an example single page outline 600 according to embodiments of the invention. The example illustrates a Level Depth of 4 (e.g., to task with levels 0.n.n.n) with the "Critical" Task Filter Applied. A value of four would indicate to also display great grandchild tasks in the swim lanes. A value of five would indicate to also display great-great grandchild tasks.

Figure 7:
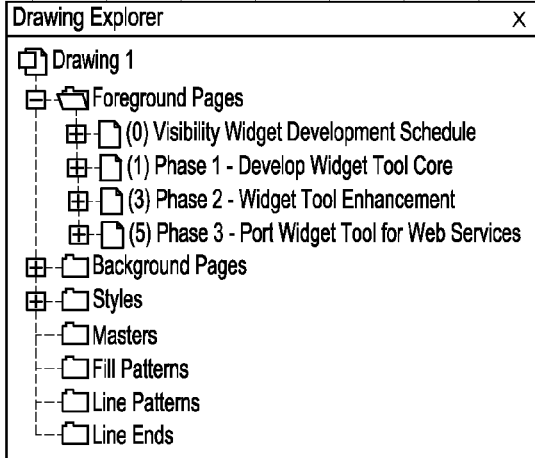
FIG. 7 illustrates an example multi page drill-in swimlane timeline according to embodiments of the invention.

FIG. 7 illustrates an example multi page outline 700 according to embodiments of the invention. In the example shown, the outline level depth is set to 1 (Each swim lane has 1 level of drill-in—see page tabs 702 of FIG. 7). A value of 1 creates separate drill-in pages for all "n" outline numbers. A value of 2 will create separate drill-in pages for all "n.n" outline numbers.

Figure 8:
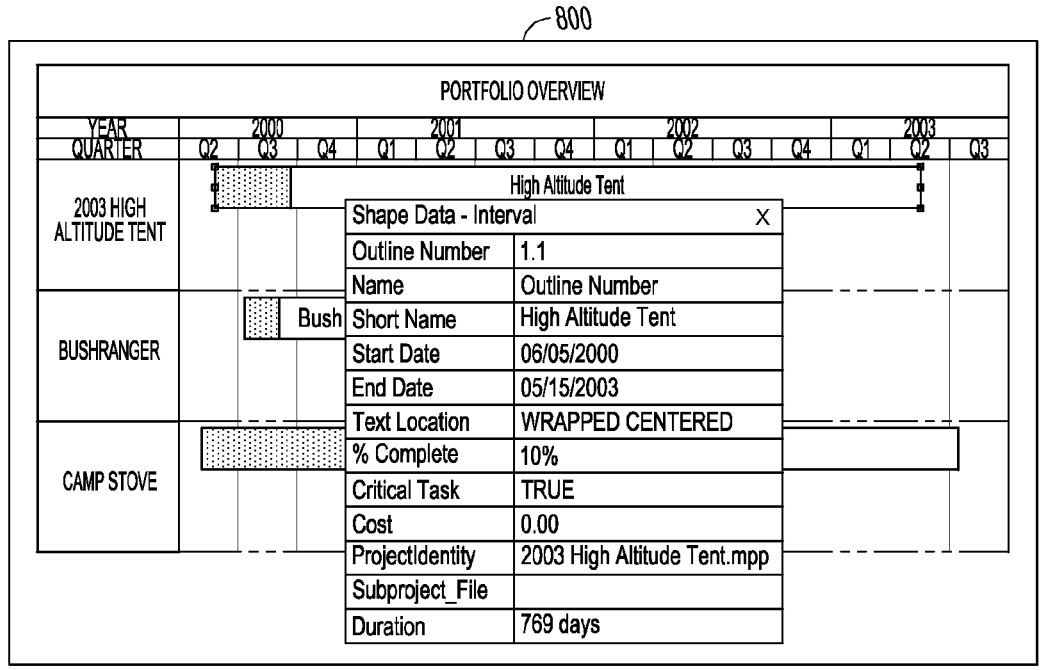
FIG. 8 illustrates an example portfolio view showing percent complete visualization and shape data properties according to embodiments of the invention.

FIG. 8 illustrates an example portfolio view showing percent complete visualization and task shape data properties according to embodiments of the invention. The swimlane timeline application 120 runs through each selected source file's summary task, and determines the earliest start and latest finish dates that encompass all source files selected. Those dates are then used as the date range for the portfolio top level timeline for the source files selected. Each source file is allocated its own swim lane, and each swim lane is placed in vertical alignment from top to bottom one beneath the other in the order in which the source files were selected.

Figure 9:
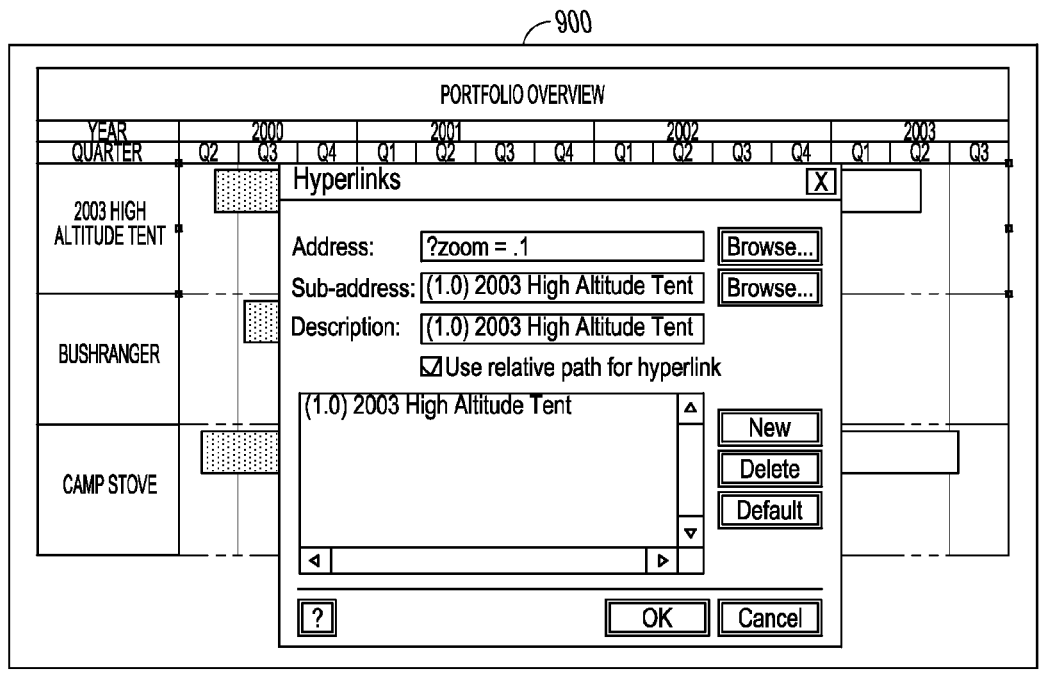
FIG. 9 illustrates an example bi-directional hyperlink automatically created with drill-in according to embodiments of the invention.

FIG. 9 illustrates an example bi-directional hyperlink created with drill-in 900 according to embodiments of the invention. The drill-in option creates a bi-directional hyperlink, and adds a Visio double-click action, to the selected drill-in object, and its newly built page. This provides an easy navigation method both within Visio, and in alternative formats, such as when the resulting swimlane generated by the swimlane timeline application 120 is saved as an Adobe PDF format, or as HTML pages.

Figure 10:
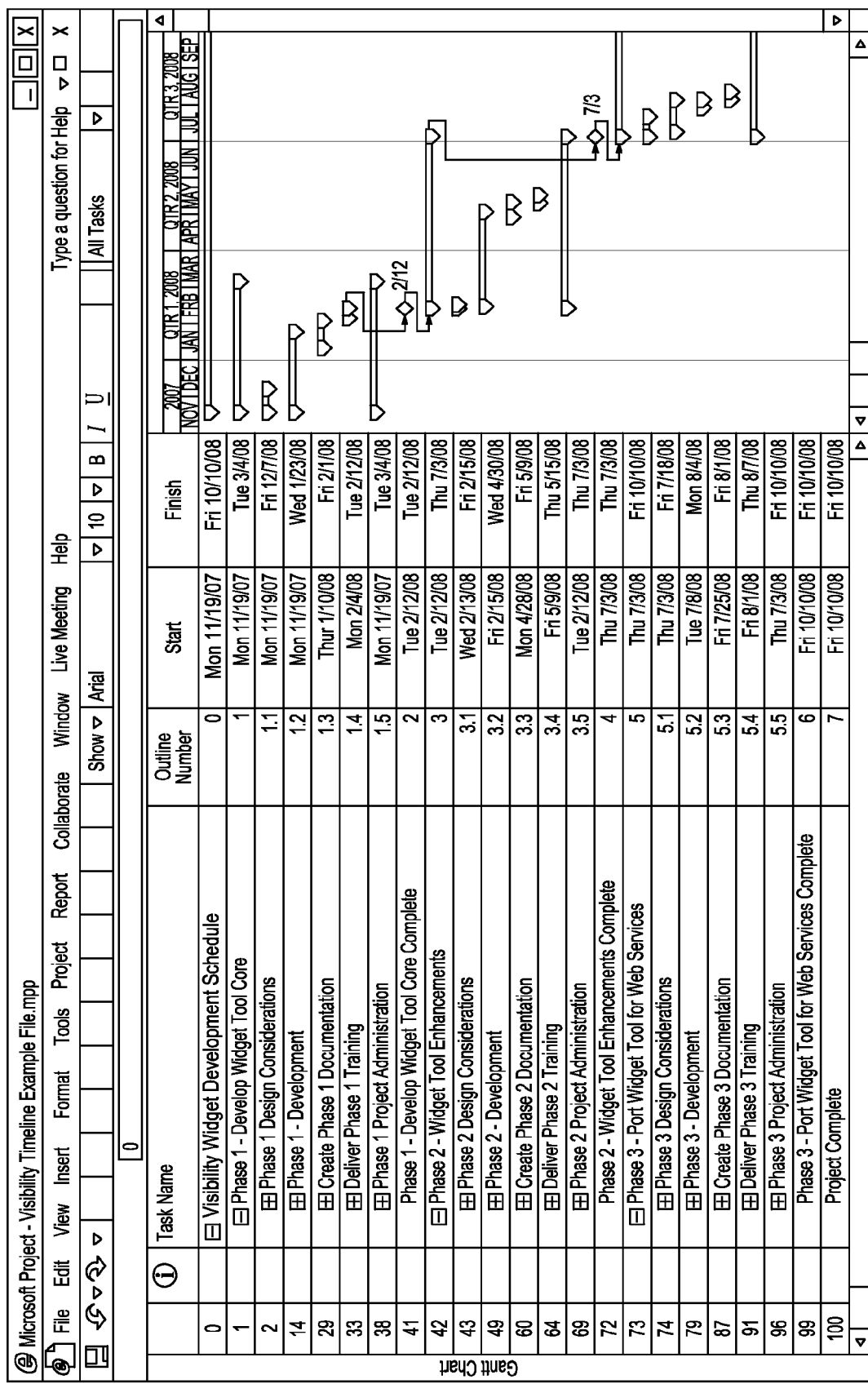
FIG. 10 illustrates an example Microsoft Office Project source file tasks highlighting unique outline numbers used by the Swimlane Timeline Tool to create the visualization hierarchy according to embodiments of the invention.

FIG. 10 illustrates an example Microsoft Office Project source file tasks highlighting unique outline numbers 1000 according to embodiments of the invention. The swimlane timeline application 120 supports Microsoft Project 2000-2003, and Microsoft 2007, MPP file formats.

FIG. 11 illustrates an example Microsoft Office Excel source file tasks highlighting unique outline numbers 1100 according to embodiments of the invention. Various embodiments of the invention support Microsoft Excel 97-2003, and Microsoft 2007, XLS file formats.

FIG. 12 illustrates an example Microsoft Office SharePoint source tasks highlighting unique outline numbers 1200 according to embodiments of the invention. Various embodiments of the invention support Microsoft SharePoint 2003 and 2007 Task Lists.

Figure 13A:
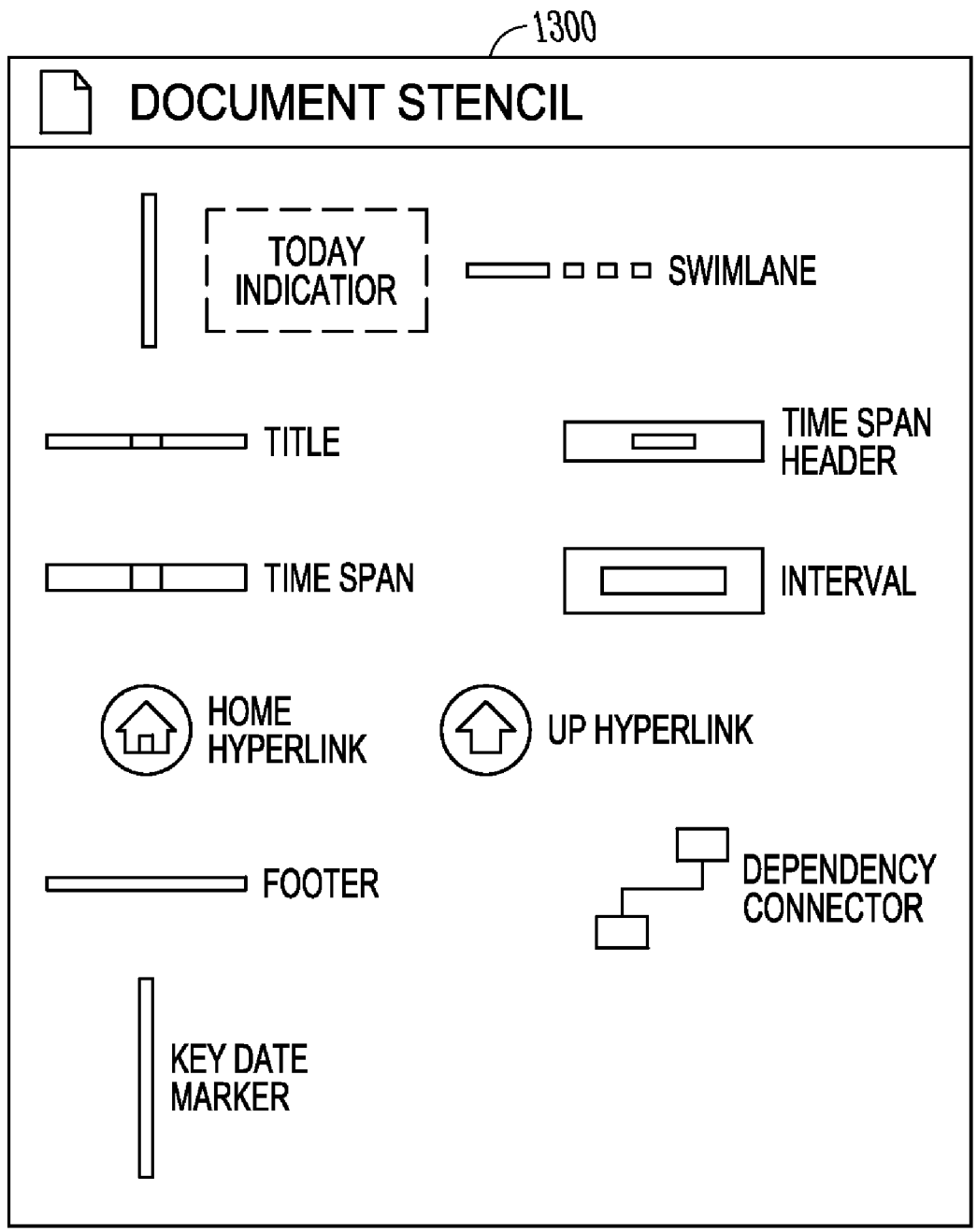
FIG. 13 illustrates an example of the shapes used in a swimlane timeline and alternate view according to embodiments of the invention.
Figure 13B:
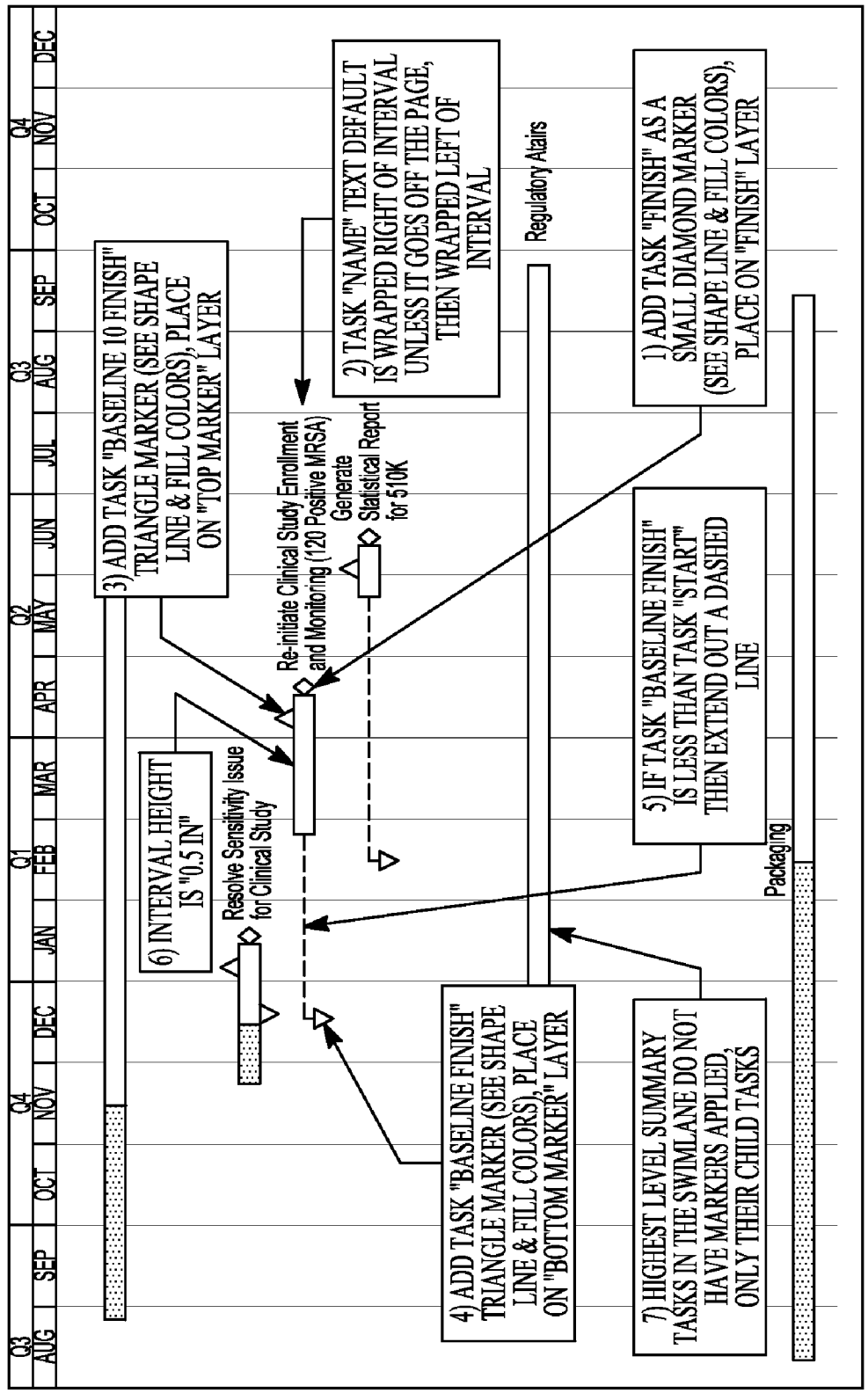

FIG. 13 illustrates an example 1300 of the shapes used in a swimlane timeline and alternate view according to embodiments of the invention. The shapes used to create the swimlane timeline may be custom shapes or shapes that are provided as default shapes with Visio or other software. The shapes can be seen in a Document Stencil that may be part of documents generated by the swimlane timeline application 120. Example shapes in a document stencil are illustrated. The swimlane timeline local document stencil may include, for example: a Date Indicator, a Swimlane, a Title, a Time Span Header, a Time Span, an Interval (this intelligent shape can change geometry from rectangle to diamond, star, pin, double-triangle, and up arrow based on our code's evaluation of the source data), a Footer, a Key Date Marker, and other shapes. An example alternate view is also illustrated in FIG. 13.

Figure 14:
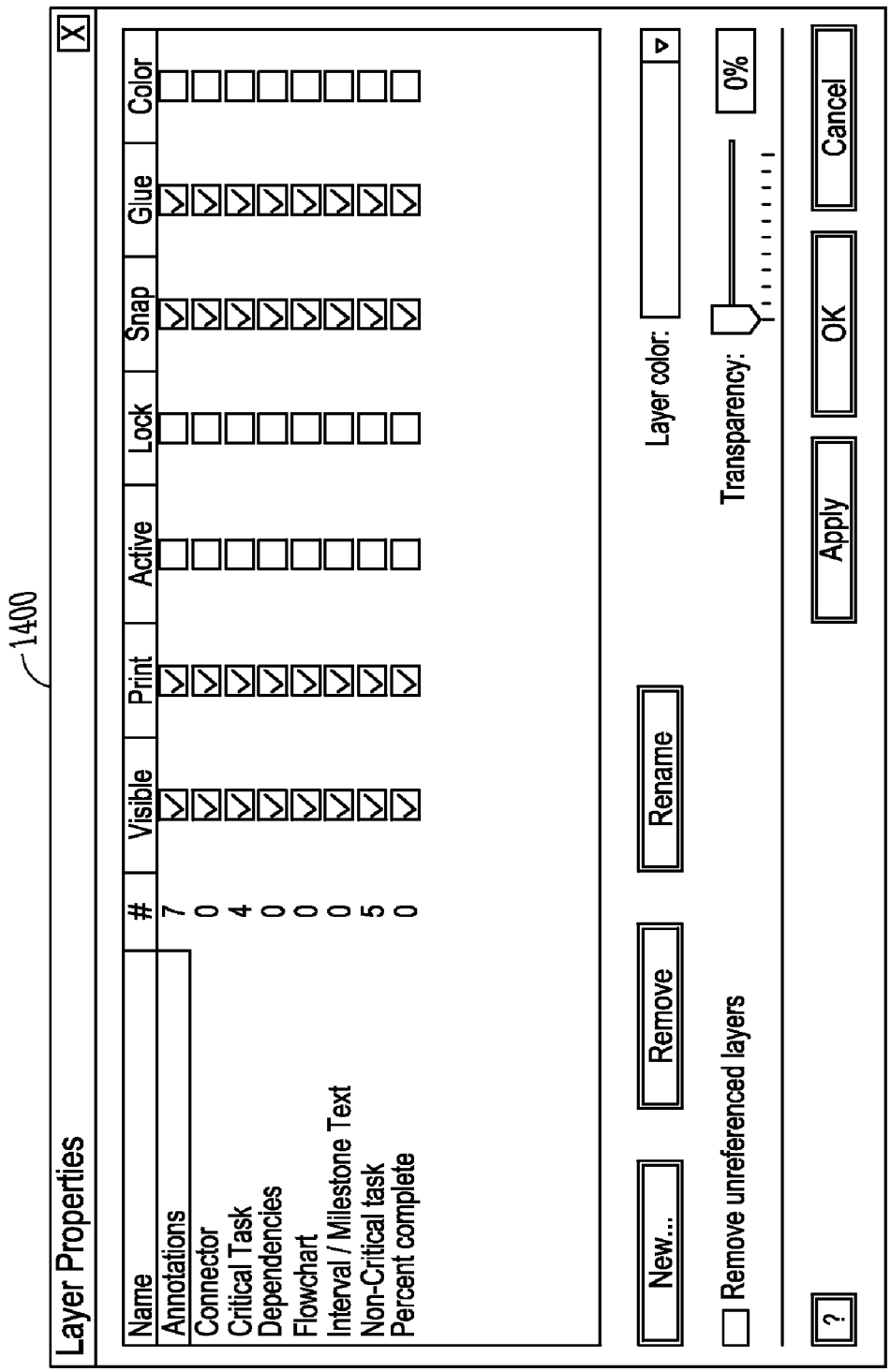
FIG. 14 illustrates an example of some Visio layer properties used by embodiments of the invention.

FIG. 14 illustrates an example layer property control and selection 1400 according to embodiments of the invention. The layers are generated by the swimlane timeline application 120, and then displayed in a diagramming software application. For example, in Visio, users may turn off all layers and then only show specific ones, like "Critical Task", or, if desired, the user could turn just the Interval/Milestone text layer off. Additional layers may also exist for Baseline, Baseline10, Finish, and other characteristics or details.

Figure 15:
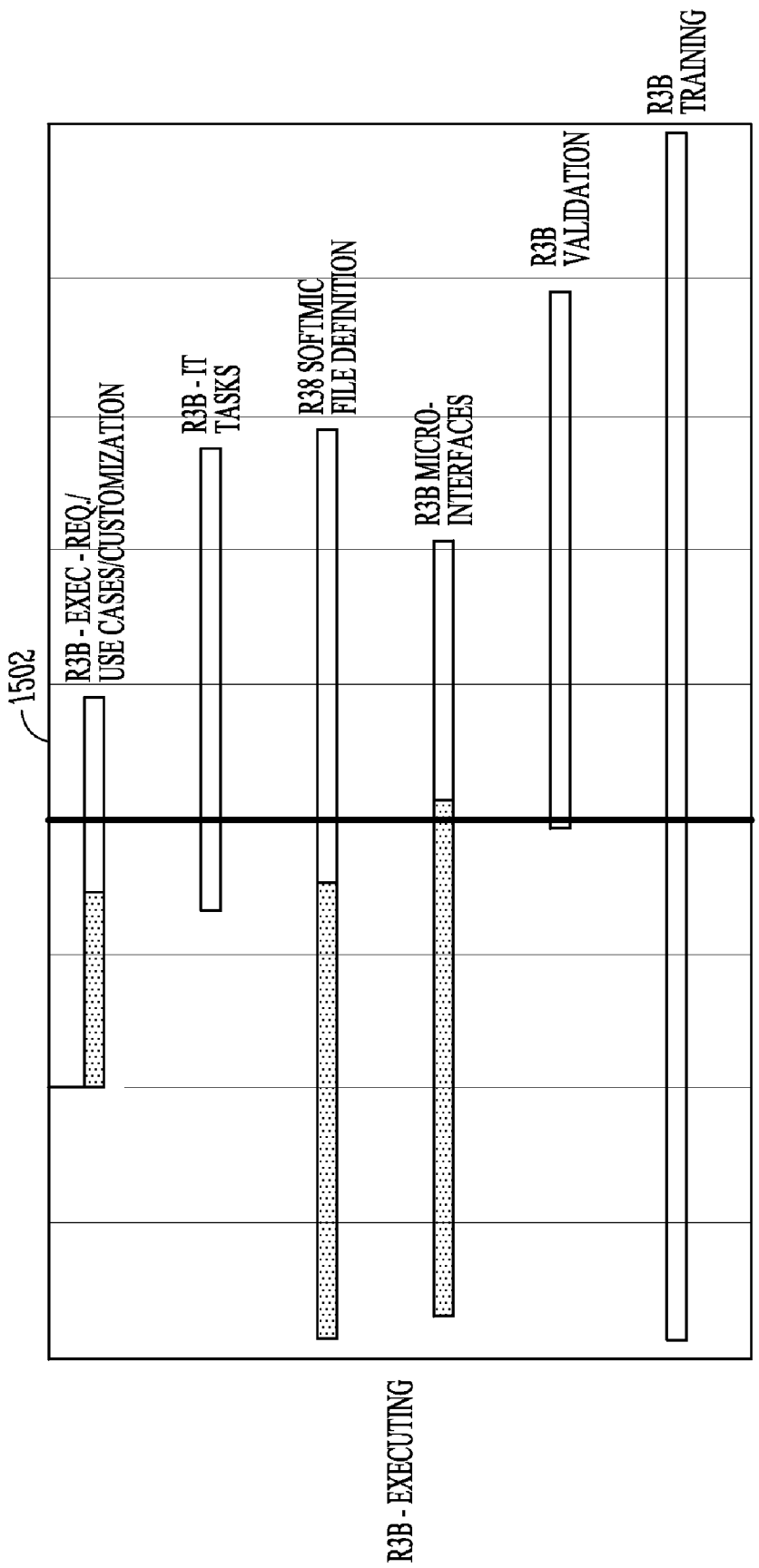
FIG. 15 illustrates a thin interval style for a swimlane timeline diagram according to embodiments of the invention.

FIG. 15 illustrates a thin interval style for a swimlane timeline diagram according to embodiments of the invention. Some embodiments allow a user to switch interval visualization styles from "Thick Intervals" (default) to "Thin Intervals". Customized interval styles may also be defined.

Figure 16:
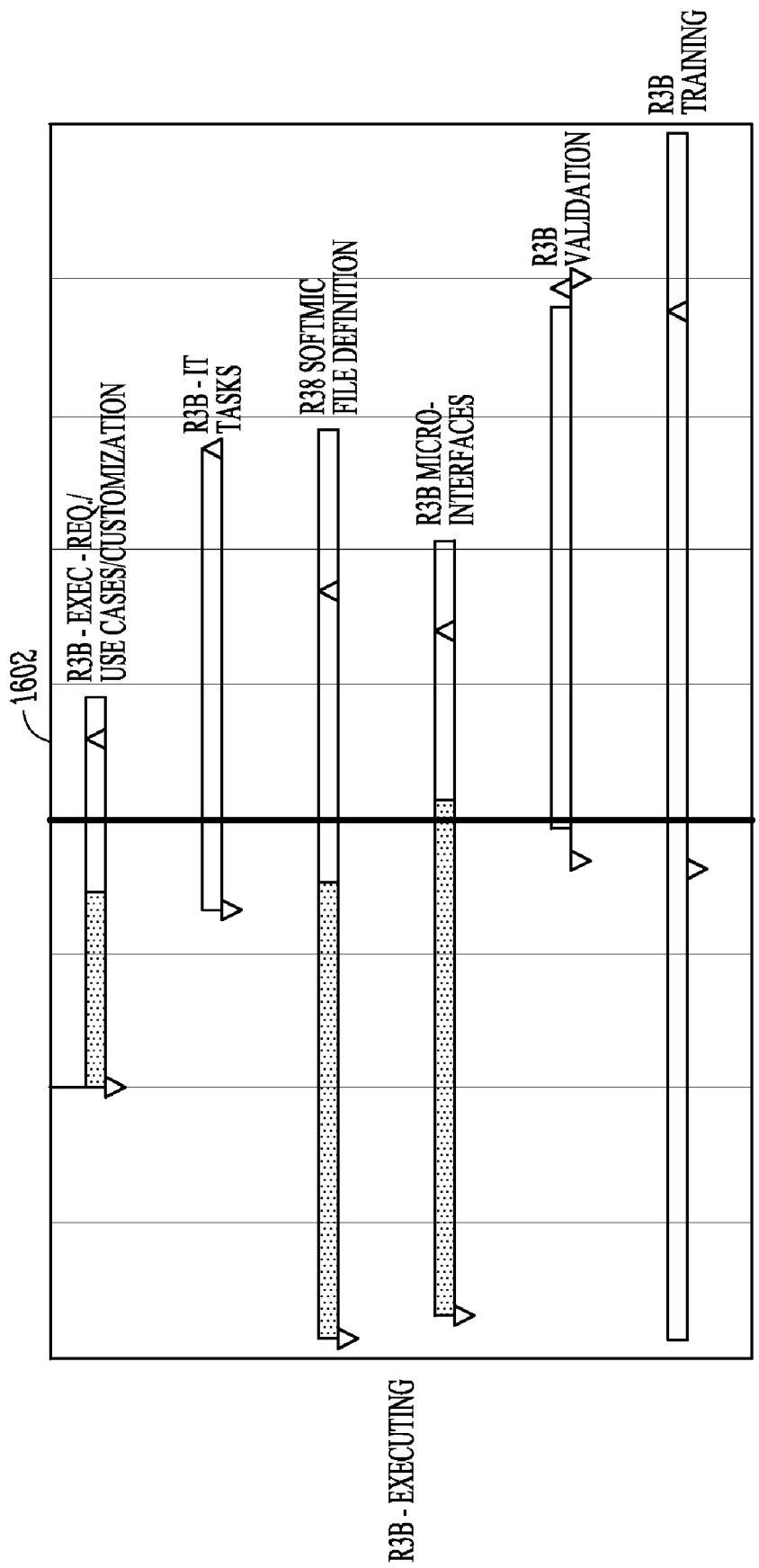
FIG. 16 illustrates an interval marking style according to embodiments of the invention.

FIG. 16 illustrates an interval marking style according to embodiments of the invention. In some embodiments, there are two Interval Marker Styles to choose from: Baseline Finish/Outlook Finish, and Baseline Start/Baseline Finish. An example of Baseline Start/Baseline Finish is illustrated in FIG. 16.

In addition to the examples provided above, various embodiments provide a shading style to be applied based on a percentage complete of a task. In some embodiments there are two Shading Styles to choose from: Percent Complete and Percent Progress (default). The percent complete shading style uses the MS Project % Complete value directly to determine what percent of the interval to shade. The percent progress uses the following formula to determine the percent shading:

$$\text{Percent Progress} = [\min(\text{today's date}, \text{finish}) - \text{start}] / (\text{finish} - \text{start}) * SPI$$

where SPI is the "Schedule Performance Index" showing the ratio of the budgeted cost of work performed (BCWP) to the budgeted cost of work scheduled (BCWS) or (BCWP/BCWS).

Figure 17:
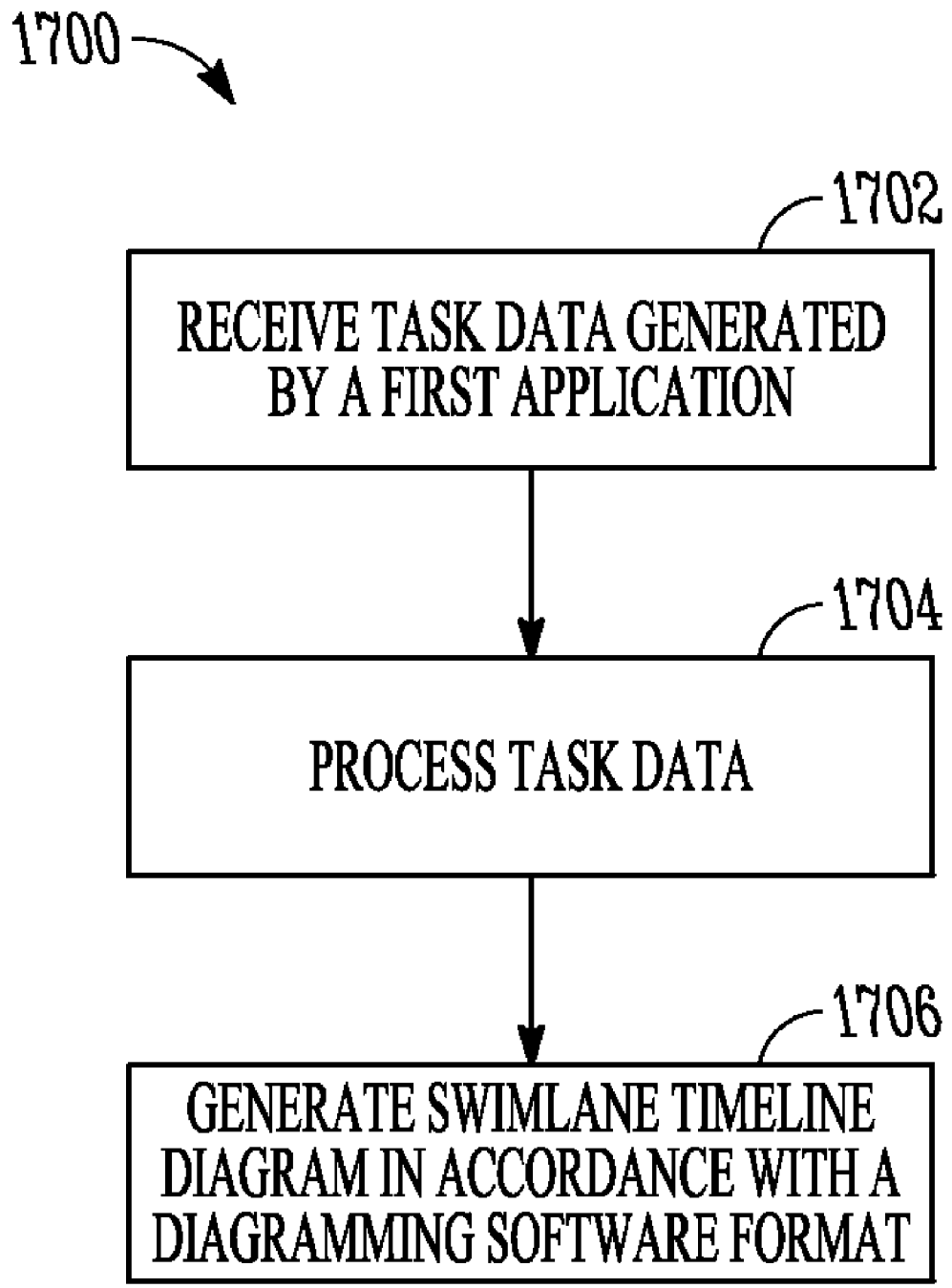
FIG. 17 is a flowchart illustrating a method for generating a swimlane timeline diagram according to embodiments of the invention.

FIG. 17 illustrates a method 1700 for generating a swimlane timeline diagram according to embodiments of the invention. The method begins at block 1702 by receiving task data. The task data may be received from a file, or over a network connection. In some embodiments, the task data may be in a file generated by a project management application such as Microsoft Project. Additionally, the task data may be read from a spreadsheet file such as Microsoft Excel. Further, the task data may be read from a SharePoint formatted file.

At block 1704, a system implementing the method processes the task data. In some embodiments, the task data is processed according to user preferences and display settings. In some embodiments, the placement and layout of tasks for the generation of the swimlane timeline diagram based on the task outline numbers, or alternatively, a work breakdown structure field. The text field values for task outlines may be represented as "n.n.n . . . " values. A value of "0" indicates the top level summary task. A value of "1–n" represents the sublevel child tasks of the summary task. A value of "n.1–n" represents the lower level grandchild tasks of the summary task and it also represents the children of the sublevel tasks.

If a single source file received at block 1702, then the task outline numbers, are interpreted in the following manner:
  a. The user specified starting outline number "n" becomes the top level summary task for the swimlane timeline, and its name is the swimlane timeline title. Its start and finish dates are the timeline start and finish dates.
  b. The "n.n" interval tasks become the swim lanes. The "n.n" milestone tasks are placed in a special "High Level Milestones" swim lane. Milestones are defined as tasks with zero duration where the start date and start time is equal to the finish date and finish time.
  c. The "n.n.n . . . " tasks become the intervals & milestones displayed in the swim lanes.

If multiple source files are received at block 1702, then the task outline numbers are interpreted in the following manner:
  a. The swimlane timeline is given a default title of "Portfolio View". The title can later be changed by the user with the Visio text tool.
  b. The user specified starting outline number "n" for each source file is evaluated to determine the earliest start date and latest finish date to encompass all tasks. These dates are then used as the start and finish dates for the Portfolio View timeline start and finish dates.
  c. The user specified starting outline number task name for each source file becomes each swim lane title.
  d. Each source file's associated "n.n" interval and milestone tasks are placed within their respective swim lane.

User custom preferences for the swimlane timeline visualization is supported via source file(s) custom task fields in some embodiments:
  a. "VisibilityFlag" yes/no flag
  b. "VisibilityColor" number
  c. "VisibilityType" number
  d. "VisibilityShortName" text User preferences are preserved in an XML file stored in the Microsoft Windows user "Application Data" "Visibility.biz" sub-directory. User preferences are restored with subsequent openings of the source file selection dialogue. Stored preferences may include:
  a. Last subdirectory used for source file(s)
  b. Checkbox setting to apply source file custom task fields
  c. Checkbox setting to show "critical" tasks In some embodiments, various combinations of the following additional user preferences may be supported by the Swimlane Timeline application 120:
  a. Display task percent complete
  b. Display task dependencies
  c. Display timeline interval highlight
  d. Display Today's date highlight
  e. Filter tasks based on "critical" field
  f. Filter timeline date range
  g. Filter task swim lanes to display
  h. Customize and select text size and color palette At block 1706, a swimlane timeline diagram is output according to the processed task data and further according to a diagramming software format. In some embodiments, a Microsoft Visio format may be used.

User selected task drill-in on a single task creates a new Visio page in the same Visio VSD file. The new page name is the user selected task name preceded with the task outline number in parenthesis. The swimlane timeline application uses the selected task outline number as the starting outline number for the new swimlane timeline generated, and the diagram will be visualized and interpreted described above.

Simultaneous drill-in of multiple swim lane tasks is a user preference. When selected, separate swimlane timeline pages will be generated as described above. The drill-in process is repeated for the number of levels specified.

In the various embodiments, any of the components of system 100 can include hardware, firmware, and/or software for performing the operations described herein. Machine-readable media includes any mechanism that provides (e.g., stores and/or transmits) information in a form readable by a machine (e.g., a computer, server, etc.). For example, tangible machine-readable media includes read only memory (ROM), random access memory (RAM), magnetic disk storage media, optical storage media, flash memory machines, etc. Machine-readable media also includes any media suitable for transmitting software over a network.

General

Thus, systems and methods to generate swimlane timeline diagrams with the Swimlane Timeline application have been described. Although the present inventive subject matter has been described with reference to specific example embodiments, it will be evident that various modifications and changes may be made to these embodiments without departing from the broader spirit and scope of the inventive subject matter. The swimlane timeline may be implemented in various document object models, according to various example embodiments. While the Visio object model has been described herein, the inventive subject matter is not limited to only a Visio object model. Accordingly, the specification and drawings are to be regarded in an illustrative rather than a restrictive sense. Many other embodiments will be apparent to those of skill in the art upon review of the above description.

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

The invention claimed is:

1. A method for transforming task data to an output swimlane timeline diagram, the method comprising:
receiving, using one or more processors, task data from a plurality of source files generated by a plurality of first application applications, the task data including data for source tasks;
processing, using one or more processors, the task data in accordance with user selected filters and display preferences; and
generating, using one or more processors, a swimlane timeline diagram for the source tasks in accordance with the processed task data, and further in accordance with a diagramming software format, wherein generating the swimlane timeline diagram includes:
processing the source tasks according to task outline numbers corresponding to respective source tasks;
determining an outline level from a user preference;
titling the swimlane timeline diagram with a title diagram element oriented at the top of the swimlane timeline diagram based on the outline level;
creating a horizontally oriented timeline from a first plurality of diagram elements spanning the swimlane timeline diagram and oriented directly under the title diagram element;
and creating a visual representation of a plurality of horizontally oriented swimlanes using a second plurality of diagram elements, wherein creating the visual representation of each horizontally oriented swimlane comprises:
creating a swimlane title element with text of the derived from a parent source task in the task data, the swimlane title element oriented at an end of the swimlane and configured to span the swimlane vertically; and
creating one or more swimlane child elements including information from one or more descendent source tasks exclusive to each swimlane child element, the descendent source tasks being descendents from the parent source task and present in the task data;
wherein the outline numbers represent a plurality of outline levels,
wherein the task outline numbers have the form "n1.n2.n3 . . . " and wherein processing the task outline numbers includes:
evaluating task data for outline number "n1" in the source file to determine the earliest start date and latest finish date over all tasks, the outline number "n1" corresponding to the outline level;
designating the earliest start date and the latest finish data as the start and finish date for a Portfolio View timeline;
determining the swim lane title element text for each horizontally oriented swim lane based on the starting outline number task; and
placing each source file's associated "n1.n2" interval and milestone tasks within their respective horizontally oriented swim lane.

2. The method of claim 1, wherein the diagramming software format is a vector based format including shape data that is preserved in the software format.

3. The method of claim 1, wherein creating the one or more swimlane child elements includes creating a control that toggles between a summary and a drill-down view of the respective one or more descendent source tasks.

4. The method of claim 1, wherein creating the one or more swimlane child elements includes creating a progress visual element corresponding to each of the one or more swimlane child elements in a depth oriented toggleable layer of the swimlane timeline diagram.

5. The method of claim 1, wherein the plurality of source files include one or more of a project file, a spreadsheet file, or a collaboration software file that includes a task.

6. The method of claim 1, further comprising placing copies of the task data into an application cache buffer.

7. The method of claim 1, comprising:
overriding the outline level based on a single page user preference; and
determining an outline level based the task data such that the swimlane timeline diagram fits on a single page.

8. The method of claim 1, wherein generating the swimlane timeline diagram includes processing the source tasks according to a work breakdown structure field for the source tasks.

9. The method of claim 1, wherein the user selected display preferences are expressed in task fields, the task fields including visibility, visibility color, visibility type and visibility short name fields.

10. The method of claim 1, wherein the user selected display preferences are expressed in task fields, the task fields including Display task percent complete, Display task dependencies, Display timeline interval highlight, Display Today's date highlight, Filter timeline date range, and Filter task swim lanes to display fields.

11. The method of claim 1, and further comprising receiving data defining a user specified text size and color palette.

12. The method of claim 1, and further comprising filtering tasks based on a critical field in the task data.

13. A system for transforming task data to a swimlane timeline diagram, the system comprising:
one or more processors;
a plurality of source files having task data, the plurality of source files generated by a plurality of first applications, the task data including data for source tasks;
a swimlane generation application operable to cause the one or more processors to:
receive the task data;
process the task data in accordance with user selected filters and display preferences;
and generate a swimlane timeline diagram for the source tasks in accordance with the processed task data, and further in accordance with a diagramming software format, wherein to generate the swimlane timeline diagram, the swimlane generation application is operable to cause the one or more processors to:
process the source tasks according to task outline numbers corresponding to respective source tasks;
determine an outline level from a user preference; title the swimlane timeline diagram with a title diagram element oriented at the top of the swimlane timeline diagram based on the outline level;

create a horizontally oriented timeline from a first plurality of diagram elements spanning the swimlane timeline diagram and oriented directly under the title diagram element; and create a visual representation of a plurality of horizontally oriented swimlanes using a second plurality of diagram elements, wherein to create the visual representation of each horizontally oriented swimlane includes to:

create a swimlane title element with text of the derived from a parent source task in the task data, the swimlane title element oriented at an end of the swimlane and configured to span the swimlane vertically; and create one or more swimlane child elements including information from one or more descendent source tasks exclusive to each swimlane child element, the descendent source tasks being descendents from the parent source task and present in the task data;

wherein the outline numbers represent a plurality of outline levels, wherein the task outline numbers have the form "n1.n2.n3..." and wherein processing the task outline numbers includes:

evaluating task data for outline number "n1" in the source file to determine the earliest start date and latest finish date over all tasks, the outline number "n1" corresponding to the outline level;

designating the earliest start date and the latest finish data as the start and finish date for a Portfolio View timeline;

determining the swim lane title element text for each horizontally oriented swim lane based on the starting outline number task; and placing each source file's associated "n1.n2" interval and milestone tasks within their respective horizontally oriented swim lane.

14. The system of claim 13, wherein the diagramming software format is a vector based format including shape data that is preserved in the software.

15. The system of claim 13, wherein, to create the one or more swimlane child elements the swimlane generation application is operable to cause the one or more processors to create a control configured to toggle between a summary and a drill-down view of the respective one or more descendent source tasks.

16. The system of claim 15, wherein to create the one or more swimlane child elements the swimlane generation application is operable to cause the one or more processors to create a progress visual element corresponding to each of the one or more swimlane child elements in a depth oriented toggleable layer of the swimlane timeline diagram.

17. The system of claim 13, wherein the plurality of source files data sources include one or more of a project file, a spreadsheet file, or a collaboration software file that includes a task.

18. A computer-readable medium having computer-executable instructions for causing a processor to perform a method for transforming task data to an output swimlane timeline diagram, the method comprising:

receiving, using one or more processors, task data from a plurality of source files generated by a plurality of first application applications, the task data including data for source tasks;

processing, using one or more processors, the task data in accordance with user selected filters and display preferences; and generating, using one or more processors, a swimlane timeline diagram for the source tasks in accordance with the processed task data, and further in accordance with a diagramming software format, wherein generating the swimlane timeline diagram includes:

processing the source tasks according to task outline numbers corresponding to respective source tasks;

determining an outline level from a user preference;

titling the swimlane timeline diagram with a title diagram element oriented at the top of the swimlane timeline diagram based on the outline level;

creating a horizontally oriented timeline from a first plurality of diagram elements spanning the swimlane timeline diagram and oriented directly under the title diagram element;

and creating a visual representation of a plurality of horizontally oriented swimlanes using a second plurality of diagram elements, wherein creating the visual representation of each horizontally oriented swimlane comprises:

creating a swimlane title element with text of the derived from a parent source task in the task data, the swimlane title element oriented at an end of the swimlane and configured to span the swimlane vertically; and creating one or more swimlane child elements including information from one or more descendent source tasks exclusive to each swimlane child element, the descendent source tasks being descendents from the parent source task and present in the task data;

wherein the outline numbers represent a plurality of outline levels, wherein the task outline numbers have the form "n1.n2.n3..." and wherein processing the task outline numbers includes:

evaluating task data for outline number "n1" in the source file to determine the earliest start date and latest finish date over all tasks, the outline number "n1" corresponding to the outline level;

designating the earliest start date and the latest finish data as the start and finish date for a Portfolio View timeline;

determining the swim lane title element text for each horizontally oriented swim lane based on the starting outline number task; and placing each source file's associated "n1.n2" interval and milestone tasks within their respective horizontally oriented swim lane.

* * * * *